INVENTOR
BRITTON CHANCE
BY Herman L. Gordon
ATTORNEY

United States Patent Office 3,676,005
Patented July 11, 1972

3,676,005
RAPID-SCANNING DUAL WAVELENGTH SPECTROPHOTOMETER

Britton Chance, % Johnson Research Foundation, Medical School, University of Pennsylvania, Philadelphia, Pa. 19104
Filed Mar. 17, 1971, Ser. No. 125,252
Int. Cl. G01j 3/42
U.S. Cl. 356—97       11 Claims

ABSTRACT OF THE DISCLOSURE

A dual wavelength spectrophotometer for recording reactions in turbid suspensions of biological materials, wherein one of the inspection wavelengths is held constant and the other inspection wavelength is cyclically varied over a range of the order of 40 nm. and at a rate of the order of 20 nm./sec. A noise-compensating photomultiplier is included to compensate for light source noise. A tapped potentiometer is employed for base line correction, and a comparator and error detector is employed to adjust the photomultiplier high voltages for correcting wavelength-dependent sensitivity errors.

---

This invention relates to dual wavelength spectrophotometers, and more particularly to a dual wavelength spectrophotometer wherein one of the time-sharing inspection wavelengths is varied so as to scan the spectrum of components in a sample under study.

A main object of the invention is to provide a novel and improved dual wavelength spectrophotometer provided with means to scan the spectrum of components of a sample under study over a reasonable wavelength range and at a relatively rapid rate, so as to provide improved sensitivity and accuracy in the recording of oxidation-reduction and other reactions of membrane-bound components in turbid suspensions of biological materials and of other materials.

A further object of the invention is to provide an improved dual wavelength spectrophotometer of the scanning type provided with means for compensating for light source noise and provided with means for providing relatively precise base line corrections.

A still further object of the invention is to provide an improved noise-compensated dual wavelength scanning spectrophotometer provided with means for compensating for wavelength-dependent sensitivity errors in its components.

Figure 1:
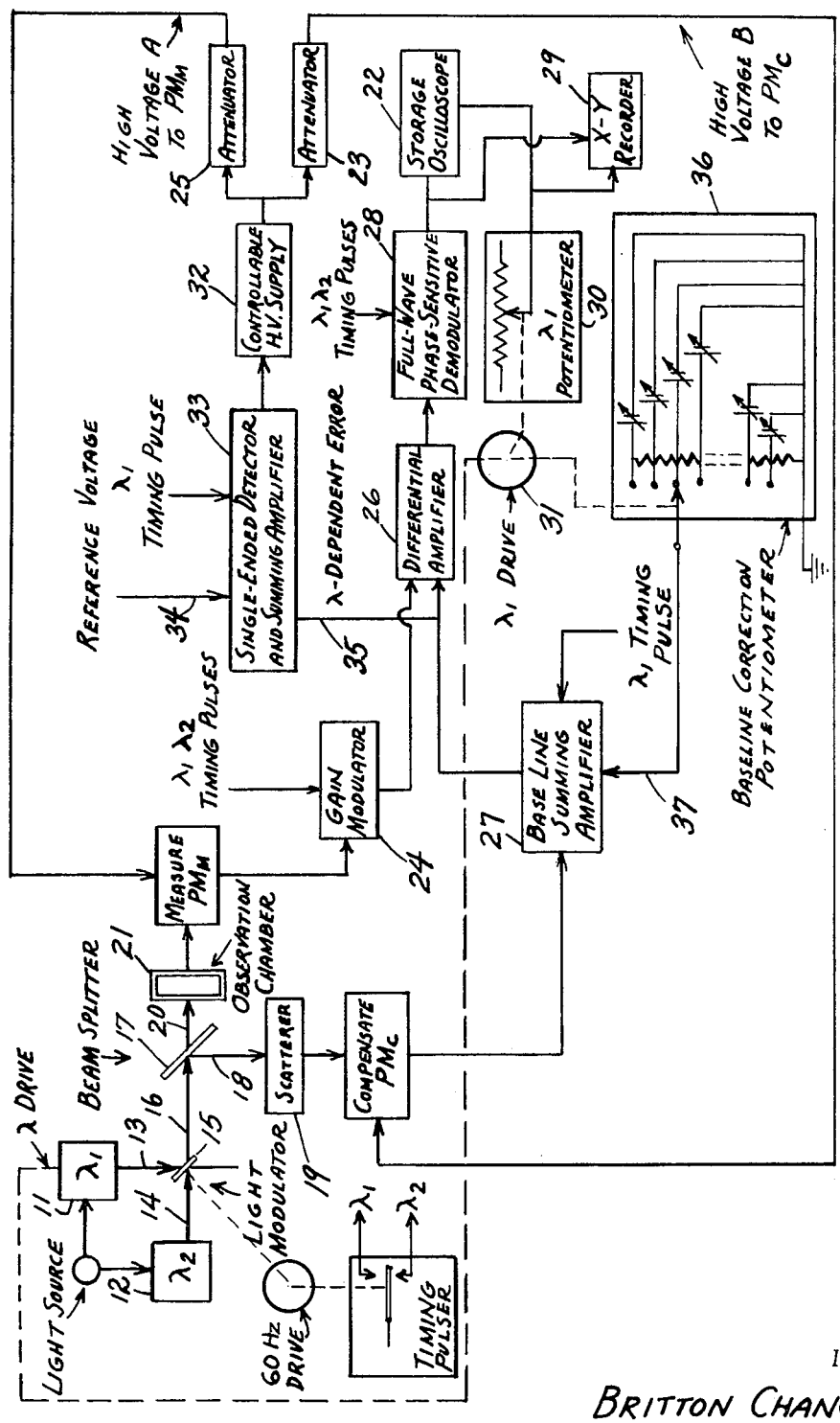

Further objects and advantages of the invention will become apparent from the following description and claims, and from the accompanying drawings, wherein:

FIG. 1 is a block diagram schematically illustrating an improved dual wavelength spectrophotometer according to the present invention.

Figure 2:
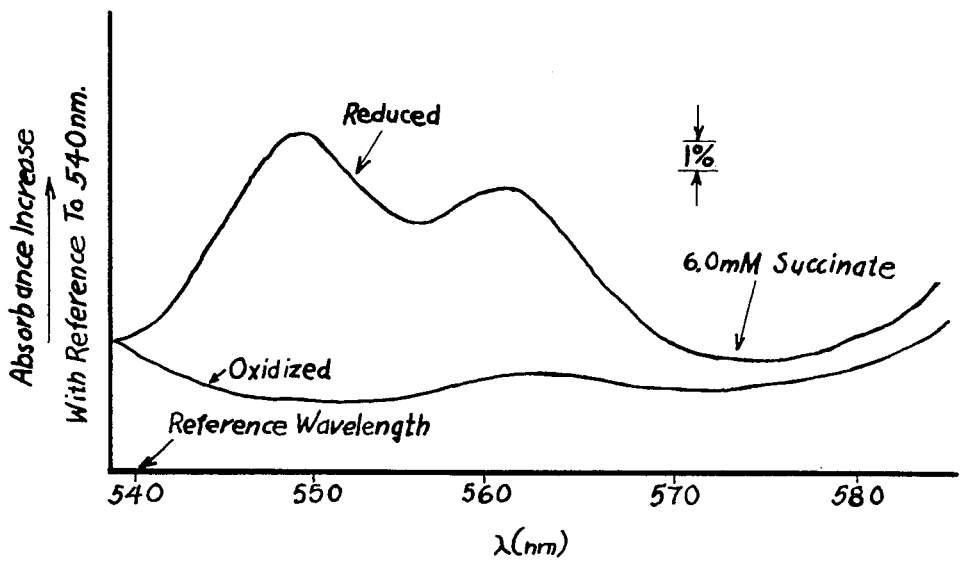

FIG. 2 is a graph illustrating the performance of the dual wavelength spectrophotometer of FIG. 1 in measuring the oxidized-minus-reduced spectrum of the cytochromes of mitochondria isolated from beef heart. In the configuration employed here, no corrections were inserted from the baseline-correcting potentiometer device or from the wavelength-dependent error circuit. Only the compensating photomultiplier and gain modulator were employed to correct the baseline. The beef heart mitochondria was at 2.3 mg of protein per ml., with a 1 cm. optical path; the "oxidized" spectrum is that resulting from no addition of material; the "reduced" spectrum is that resulting 5 minutes after the addition of mM. succinate.

Figure 3:
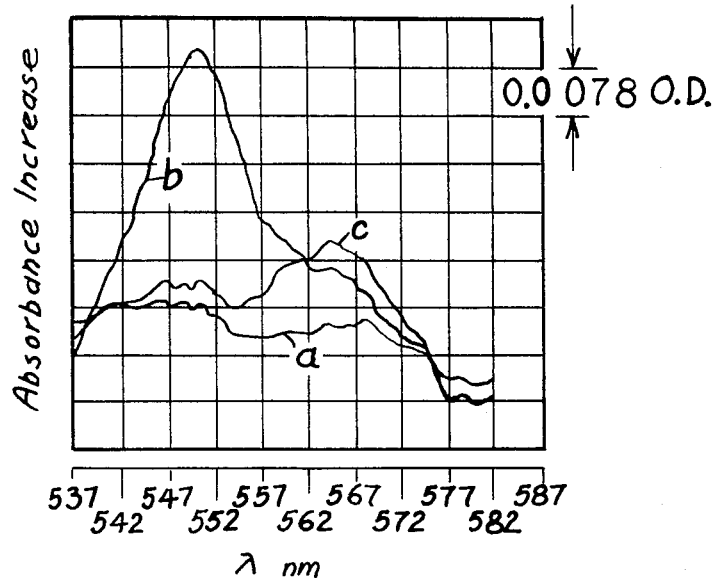

FIG. 3 is a graph illustrating the application of the dual wavelength spectrophotometer to the kinetic resolution of the spectra of the components of the respiratory chain. In this case, the baseline-correcting potentiometer device and the wavelength-dependent error circuits were both in operation. Trace $a$ is the baseline corresponding to the reduced components, the absorption bands having been eliminated by the baseline correction system. Trace $b$ is the result two seconds after adding 17 $\mu$M. oxygen. Trace $c$ is the result 10 seconds after adding oxygen. The optical path was 0.6 cm. in the rapid flow apparatus, 2 mg. of pigeon heart mitochondrial protein per ml. was used, in the presence of 6 mM. glutamate, 6 mM. succinate, 3 mM. malonate and 5 $\mu$M rotenone.

While the dual wavelength technique, primarily used for the rapid measurement of small absorbance changes at fixed pairs of wavelengths, has proven to be unequalled for the study of turbid materials such as the membrane-bound pigments of the respiratory chain, it has the intrinsic property of focussing attention upon the properties of a single component absorbing at one of the selected wavelengths. Information on components absorbing at other wavelengths is either not available at all, or is obtained only by repeating, at a variety of wavelengths, the absorbancy changes subsequent to adding substrates to fresh samples of the same material, or by recycling a single sample through its initial conditions so that the kinetics of the components may be re-enacted at appropriate wavelengths. (See B. Chance, Review of Scientific Instruments, 22, p. 634 (1951) and B. Chance, Nature, 169, p. 215 (1952).) The possibility of recording the kinetics of absorption changes of a single component, and yet at the same time obtaining the end points for absorbancy change of associated components on a slower time base, provides a technique of considerable importance and utility for those who study membrane-bound multi-enzyme systems.

Improvements to the dual wavelength technique now permit scanning at one wavelength with respect to the other over a spectral interval of 50 nm. at theoretical rates of over 100 nm./sec. and observed rates of 20 nm./sec. A high degree of sensitivity and stability is obtained, not only from the dual wavelength technique itself, but also from a lamp-noise compensation circuit. (See B. Chance, D. Mayer, N. Graham, and V. Legallais, Review of Scientific Instruments, 41, p. 111 (1970).) The baseline error is less than 2% over the spectral interval 530–580 nm. The demodulator rise time is 20 msec., and the noise level is less than 0.5% when employing a turbid suspension of membranes. As will be presently described, an apparatus according to the present invention was used for delineating the oxidation-reduction state of several cytochromes in mitochondria. Many other possible applications to sensitive spectroscopy are indicated.

The technique afforded by the apparatus of the present invention would appear to offer advantages over the conventional wavelength techniques which, for precision work, require two samples, one for reference and the other for measurement, and record the absorbance difference between the two as a function of wavelength. Mismatching of the contents of the two cuvettes leads sometimes to skewed and sometimes to variable baselines for the spectroscopic recordings. A basic advantageous feature of the improved apparatus described herein comprises noise-compensation of the dual wavelength spectrophotometer (see B. Chance et al., Review of Scientific Instruments, 41, p. 111 (1970), above cited). The baseline error is further reduced by the use of a simple wavelength-driven potentiometer corrector. Dynode voltage control is also included, in order to render the sensitivity of the recording independent of the wavelength variation.

Referring to the drawings, a block diagram of a typical wavelength scanning apparatus according to the present invention is shown in FIG. 1. Appropriate wavelengths $\lambda_1$ and $\lambda_2$ are selected respectively from two monochromators 11 and 12 so that $\lambda_1$ and $\lambda_2$ are near the peak and trough, respectively, of the absorption band to be studied. The two emergent light beams 13 and 14 impinge upon a vibrating fully reflecting mirror 15 (light modulator) in the manner diagrammatically illustrated, and the resultant time-shared beam 16 passes to a partly reflecting mirror 17, from which approximately 10% is reflected as a beam 18, which passes through a scatterer 19 to the compensating photomultiplier $PM_C$. About 90% of time-shared beam 16 passes through the partly reflecting mirror 17 and emerges as the measure beam 20, which passes through the observation chamber 21 onto the measure photomultiplier $PM_M$.

As shown in FIG. 1, the output of the measure photomultiplier $PM_M$ passes via the gain modulator 24, gated by timing pulses in phase with the vibrations of mirror 15, to one of the inputs of a differential amplifier 26, as described in B. Chance et al., Review of Scientific Instruments, 41, p. 111 (1970), and disclosed in U.S. patent application S.N. 100,697, filed Dec. 22, 1970, by Britton Chance and entitled "Improvements in Dual Wavelength Spectrophotometary." The output of the compensating photomultiplier $PM_C$ passes via a conventional summing amplifier 27, gated by the $\lambda_1$ timing pulses, to the other input of differential amplifier 26. The output (difference signal) of amplifier 26 passes via a full wave sensitive demodulator 28, gated by the $\lambda_1\lambda_2$ timing pulses, to the vertical deflection element of suitable recording means, such as a storage oscilloscope 22 or a conventional X–Y recorder 29. The horizontal sweep potentials to these recorders are furnished by the $\lambda_1$ potentiometer 30 driven by suitable conventional wavelength cyclic scanning drive means 31, which may be similar to that shown in U.S. Pat. No. 2,971,429 to Hugh K. Howerton.

Gain modulator 24 may comprise an adjustable switched load resistor type of circuit similar to that described in B. Chance et al., Review of Scientific Instruments, 41, p. 111 (1970) and disclosed in the above-mentioned previously filed patent application S.N. 100,697.

The dynodes of photomultipliers $PM_M$ and $PM_C$ are supplied with high voltage from a controllable high voltage supply 32 through respective adjustable attenuators 25 and 23. The high voltage supply 32 is controlled by a conventional single-ended detector and summing amplifier 33, gated by the $\lambda_1$ timing pulses. The control signal output of the high voltage modulating device 33 is derived with respect to a reference input voltage at 34, and said control signal output is determined by an input signal at 35 comprising the output signal of the baseline summing amplifier 27.

In the usual procedure, previously employed in the prior art, for dual wavelength operation, the slit heights and slit widths of the two monochromators are adjusted so that the initial output pulses from $PM_M$ are equal, and consequently the storage oscilloscope, shown at 22, would indicate zero deflection. However, for wavelength scanning, in accordance with the present invention, this adjustment is applied at the compensating photomultiplier $PM_C$. At this time, the high voltage attenuator 23 for $PM_C$ is adjusted to a standard signal (500 mv.). At this point, the gain modulator 24 is adjusted to bring the output pulses from $PM_M$ to equality, and the high voltage attenuator 25 for $PM_M$ is adjusted to bring the signal from $PM_M$ equal to that from $PM_C$.

The two outputs, that from $PM_C$ and the gain-modulated output from $PM_M$, are equal in average value and show no pulse-to-pulse modulation. Thus, when subtracted in the differential amplifier, these potentials give zero output, and if the photomultipliers are similar and the observation chamber is empty, the output should remain zero as the wavelength is scanned and the chart recorder plots the absorbancy change as a function of wavelength.

When the observation chamber is filled with a turbid sample, the transmission onto $PM_M$ will have a different wavelength-dependency from that of $PM_C$. This difference is minimized by providing, before $PM_C$, a scatterer 19 comprising a sample of material with light-scattering properties similar to that in the observation chamber; it has not been found necessary to use a sample with identical scattering properties except in the case of exceptionally absorbing materials such as chromatophores and chloroplasts.

In addition, the apparatus of the present invention employs a baseline-correction potentiometer device 36 to remove the differential scattering between the two samples in the relatively narrow wavelength interval for which the apparatus is designed. The output of the device 36 is applied at 37 as an input to the baseline summing amplifier 27. Since amplifier 27 is gated by a $\lambda_1$ timing pulse, as shown, the compensator 36 applies a potential to the baseline summing amplifier only during the $\lambda_1$ pulse, no compensation being needed when the fixed wavelength $\lambda_2$ illuminates the photomultipliers. Thus, the differential amplifier input from the compensating photomultiplier $PM_C$ is offset appropriately according to the baseline error. In this way, adequate compensation for the difference in transmission along the two paths is obtained, and it is even possible to remove absorption bands in the sample cuvette if desired (see below).

The apparatus, operating as thus far described, will exhibit varying sensitivities as $\lambda_1$ is altered, since the active output of the lamp source and the transmission of the monochromators are wavelength-dependent. In order to maintain the response at constant sensitivity over the wavelength region to be scanned, the $\lambda_1$ pulse from $PM_C$ is peak-detected in the device 33 (see B. Chance, V. Hughes, E. F. MacNichol, D. Sayre, and F. C. Williams, "Waveforms," M.I.T. Radiation Laboratory Series, vol. 19 (1950); reprinted, Boston Technical Publishers, Inc., Lexington, 1964, p. 501) which is gated by a $\lambda_1$ timing pulse, wherein the $\lambda_1$ pulse from $PM_C$ is compared to the fixed reference voltage applied at 34 (500 mv.) of opposite polarity. Since the voltage magnitude values of these two voltages were initially set to equality, their difference will deviate as the wavelength is scanned. When such deviation occurs, the pulse output of the summing amplifier device 33 modulates the high voltage of the two photomultipliers through the controllable high voltage supply 32, so that the high voltage is pulsed to the appropriate value during the $\lambda_1$ interval to compensate for changes in sensitivity over the region scanned.

Although any difference of spectral sensitivity of $PM_M$ and $PM_C$, as well as their differing dynode voltage-gain transfer characteristics makes this compensation less than ideal, the response over the scanned wavelength region is maintained at sufficiently constant sensitivity to make said compensation highly desirable.

The details of the various block components of the system shown in FIG. 1 are in themselves conventional and are known to those skilled in the art. The optical components and the gain modulator 24 are described in detail in B. Chance et al., Review of Scientific Instruments, 41, p. 111 (1970) above cited. The other components, such as the full-wave sensitive demodulators, differential amplifiers, and the programmable high voltage supply are essentially the same as those previously described in B. Chance, Review of Scientific Instruments, 22, p. 634 (1951). The baseline compensator device 36 employs a commercially available multi-turn linear potentiometer with a large number of equally spaced taps, each supplied with an adjustable voltage. In a typical apparatus, the potentiometer was a 3-turn linear potentiometer with 26 equally spaced taps, each supplied with an adjustable voltage.

The signal-to-noise ratio obtainable with the apparatus of FIG. 1 is equal to or better than that in the usual dual wavelength apparatus of the prior art, for example, such as the apparatus described in B. Chance, Review of Scientific Instruments, 22, p. 634 (1951), since the lamp noise is minimized by $PM_C$ and differential amplifier 26 in the manner pointed out in B. Chance et al., Review of Scientific Instruments, 41, p. 111 (1970) above cited.

The scanning speed is limited by the wavelength modulation frequency and the response time of the demodulators. The latter are either peak (see B. Chance et al., "Waveforms," p. 501, above referred to) or average-peak (see B. Chance, Review of Scientific Instruments, 22, p. 634 (1951), also above referred to) detectors, and are thus capable of following reasonably well each pulse of the wavelength modulation. With the 60 Hz. chopping frequency, information from both wavelengths can be obtained in 16 msec., so that for a 2 nm. spectral interval, a scanning rate of over 100 nm./sec. is possible. The dual wavelength apparatus can also be fitted with a 400 Hz. wavelength modulation device which allows theoretical scanning rates of over 400 nm./sec. Two practical considerations appear to limit this scanning rate, however; first, the inertia of the mechanical coupling in the monochromators, which, in a typical embodiment limited the rate to between 10 and 20 nm./sec. However, there are readily available monochromators suitable for more rapid scanning; in one type, the dispersing element may be rotated at low frequencies, and in others, oscillating or rotating mirrors are provided for scanning the spectrum across the exit slit. Secondly, in this particular application, the signal-to-noise ratio may set the limit to the scanning rate in that light transmission through the sample cuvette is sufficiently small that 0.1 sec. per point may be required, thus limiting the scanning time to 20 nm./sec. for a 2 nm. spectral interval, and correspondingly less for a smaller spectral interval.

A series of actual experiments demonstrating the performance of the apparatus of FIG. 1 will now be described, the experiments illustrating the performance of the wavelength scanning spectrophotometer under two conditions: first, the observation of materials in relatively stable states that can be scanned leisurely and wherein the results can be displayed on an X–Y recorder, with minimum usage of the available equipment of FIG. 1 (for example, the experiment associated with FIG. 2, wherein only the compensating photomultiplier $PM_C$ was employed to correct the baseline); secondly, a more sophisticated mode of operation involving rapid transitions in the nature of the material under observation, with a consequent requirement for rapid recording rates and thus requiring the use of an oscillographic recorder, wherein FIG. 3 illustrates the recorded results. In FIG. 3, in addition to the use of the compensating photomultiplier $PM_C$, the tapped potentiometer device 36 was employed to remove an absortion band in the material from which the baseline was derived, and the sensitivity was automatically maintained at a substantially constant value over the interval scanned.

Referring to FIG. 2, the figure illustrates the oxidized-minus-reduced difference spectrum for cytochromes, $c$, $c_1$ and $b$ of the light fraction of beef heart mitochondria at 2.3 m. of protein per ml in a 1 cm. optical path. In the "Oxidized" trace, the oxidized sample contains no significant absorption band and therefore the compensate photomultiplier $PM_C$ alone is sufficient to maintain the baseline trace, measured with respect to 540 nm. as a reference wavelength, horizontal to within 2% over the interval 540–580 nm. Furthermore, the scan could be carried out over an interval of 20 to 30 seconds, and the use of the X–Y recorder 29 was suitable. A decrease of sensitivity of about 25% at 580 nm. with respect to that at 540 nm., due to the decrease of monochromator output, was not objectionable in this case, since the absorption bands of the components could readily be identified.

Addition of succinate causes exhaustion of oxygen and the reduction of cytochromes $c$, $c_1$ and $b$, and the spectrum is actually recorded twice ("Reduced" traces); the traces superpose, for the larger part, to within the line width of the pen (0.1%). The absorbancy change itself is relatively large, 10% at 550 nm., which converts to 2.5 $\mu$M. cytochrome $c$, the normal content of this component is this component in this type of mitochondria. Some non-specific scattering of the mitochondrial suspension can be observed in the oxidized-reduced transition; the isosbestic point in the region 570–575 nm. (see B. Chance and G. R. Williams, Journal of Biological Chemistry, 217, p. 395 (1955)) is not observed here. The experiment demonstrates, however, that in this wavelength region the simple combination of a compensating photomultiplier, with the associated gain modulator and differential amplifier, allows wavelength scanning with reasonable accuracy and with a satisfactory baseline.

Time-resolved spectra of cytochromes of pigeon heart mitochondria are shown by the charts of FIG. 3, resulting from an experiment utilizing technique in its fully developed form, made available with the apparatus of FIG. 1. FIG. 3 illustrates how the apparatus may be employed to time-resolve the spectra of the separate components of the respiratory chain, as observed in the 0.6 cm. optical path of the rapid flow apparatus (see B. Chance and V. Legallais, Review of Scientific Instruments, 22, p. 627 (1951), B. Chance and V. Legallais, Faraday Society Discussion, 17, p. 120 (1954), and B. Chance et al., Fast Reactions and Primary Processes in Chemical Kinetics, S. Claesson, Ed. (Interscience Publishers, Inc., New York, 1968) p. 437). The additional technical points here are that the baseline-correction circuit is employed and wavelength-dependent error is corrected, in an instrumental configuration that gives maximum wavelength scanning rates, in view of the available light chopping frequency, corrected baseline, and constant gain.

The mitochondria are initially anaerobic, and the baseline, electrically compensated to remove the absorption bands of the reduced components, is flat to an accuracy of approximately 0.008 in absorbance (Trace $a$); slight imperfections of the baseline remain at 547 nm., where discontinuities between the potentiometers can be observed. Generally, however, the performance is satisfactory; the deviations of the baseline between 537 and 575 nm. is 0.01 in absorbancy, and contributes the total "noise" level of the trace.

Upon adding a pulse of oxygen in Trace $b$, the absorption bands of cytochromes $c_{550}$, $b_{560}$, and a long-wave shoulder corresponding to cytochrome $b_{564}$, appear. These bands actually represent absorbancy decreases since the absorption bands of the reduced components had been cancelled out by the baseline corrector. After approximately 10 seconds, cytochrome $c$ becomes abruptly reduced due to the exhaustion of oxygen. In these uncoupled mitochondria, cytochrome $b$ is at low potential (see B. Chance et al., Proceedings of the National Academy of Science, U.S., 66, p. 1175 (1970)) and therefore equilibrates more slowly with substrate, leaving the absorption band of oxidized $b$ in the presence of reduced $c$, as indicated by Trace $c$, where a clear maximum is observed at 565 nm. In the course of one minute, the latter absorption band has also disappeared and the baseline is re-established. This experiment can be repeated at will by successive additions of oxygen in the flow apparatus. In this way, it is possible to time-resolve the absorption-difference spectra of the components of the respiratory chain.

It will be evident from the above-described experiments that the dual wavelength spectrophotometer apparatus of FIG. 1 affords a technique which can be employed to measure absorption difference spectra corresponding to two states of a single sample. This technique is extremely useful in the case of flow apparatus studies, where only one observation chamber is available and its contents are studied in different states corresponding to different times after initiating certain chemical reactions. While a variety of techniques are available to accomplish this goal, the simple compensating circuit previously described (see B. Chance et al., Review of Scientific Instruments, 41, p. 111 (1970)) removes the major part of the baseline error, down to approximately 1% in absorbancy. With the tapped potentiometer device 36 in addition to the compensating circuit, the baseline can be made straight over this wavelength interval to a higher degree of accuracy. However, a more important advantage is that absorption bands can be removed in one state to "appear" in another. With highly absorbing materials such as chromatophores, a similar sample is placed before the compensating photomultiplied $PM_C$ further to improve the baseline.

While a specific embodiment of an improved dual wavelength spectrophotometer has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a dual beam spectrophotometer, a source of radiant energy, a sample holder, means to derive two beams of different wavelength from said source, means to combine said two beams into a time-shared composite beam and to direct said composite beam toward said sample holder, measuring photosensitive signal-deriving means positioned to receive time-shared radiation from said sample holder resulting from the reception therein of said composite beam, compensating photosensitive signal-deriving means, means to divert a portion of said time-shared composite beam toward said compensating signal-deriving means, means to subtract the output of said compensating photosensitive means from the output of said measuring photosensitive means, whereby to derive a resultant signal substantially compensated for source noise, means to cyclically vary the wavelength derived from said source of one of said two beams in a manner to provide a wavelength scanning action of said one of the beams, demodulation means, means to supply said resultant signal to said demodulation means, and means to gate said demodulation means synchronously with the combining of said two beams into said composite beam and to derive a time-shared output signal therefrom comprising, respectively, a continuous spectrum representing the response to said scanning action and a baseline representing the response to the non-varied beam.

2. The dual beam spectrophotometer of claim 1, and means to derive a baseline correction signal simultaneously with the cyclic variation of the wavelength of said one of the two beams, and means to combine said baseline correction signal with the output of said compensating photosensitive means to derive a corrected compensating signal to be subtracted from the output of said measuring photosensitive means.

3. The dual beam spectrophotometer of claim 2, and means to simultaneously modify the response of both the measuring photosensitive signal-deriving means and the compensating photosensitive means in accordance with said corrected compensating signal, whereby to compensate for wavelength-dependent sensitivity errors.

4. The dual beam spectrophotometer of claim 3, and wherein said photosensitive signal-deriving means comprises respective photomultiplier tubes, and the means to modify the response of said signal-deriving means comprises means to vary the high voltage applied to the dynodes of said photomultiplier tubes.

5. The dual beam spectrophotometer of claim 4, and wherein the means to derive the baseline correction signal comprises a potentiometer device coupled to the means to cyclically vary the wavelength of said one of the two beams.

6. The dual beam spectrophotometer of claim 5, and wherein the means to combine said baseline correction signal with the output of said compensating photosensitive means comprises a summing amplifier, the output of said summing amplifier comprising said corrected compensating signal.

7. The dual beam spectrophotometer of claim 6, and wherein said photomultiplier tubes are provided with a variable high voltage supply and modulating control means connected to said high voltage supply, and wherein the means to vary the dynode high voltage comprises circuit means connecting the corrected compensating signal at the output of said summing amplifier to the input of said modulating control means.

8. The dual beam spectrophotometer of claim 7, and radiation scattering means between said diverting means and said compensating photosensitive means.

9. The dual beam spectrophotometer of claim 7, and wherein said modulating control means comprises a detector and summing amplifier having a plurality of inputs, and means applying a reference voltage to one input thereof, the corrected compensating signal being applied to another input thereof.

10. In a dual beam spectrophotometer, a sample holder, two monochromators deriving two respective radiant energy inspection beams of different wavelength, means to combine said two beams into a time-shared composite beam and to direct said composite beam toward said sample holder, measuring photosensitive signal-deriving means positioned to receive time-shared radiation from said sample holder resulting from the reception therein of said composite beam, compensating photosensitive signal-deriving means, means to divert a portion of said time-shared composite beam toward said compensating photosensitive signal-deriving means, means to subtract the output of said compensating photosensitive means from the output of said measuring photosensitive means, whereby to derive a resultant signal substantially compensated for noise, means to cyclically vary the output frequency of one of the monochromators, whereby to vary the wavelength of one of the inspection beams in a manner to provide a wavelength scanning action of said one of the beams, demodulation means, means to supply said resultant signal to said demodulation means, and means to gate said demodulation means synchronously with the combining of said two beams into said composite beam and to derive a time-shared output signal therefrom comprising, respectively, a continuous spectrum representing the response to said scanning action and a baseline representing the response to the non-varied beam.

11. In a dual beam spectrophotometer, a source of radiant energy, means to derive two beams of different wavelength from said source, means to combine said two beams into a time-shared composite beam, a sample holder, means to direct said composite beam toward said sample holder, measuring photosensitive signal-deriving means positioned to receive time-shared radiation from said sample holder resulting from the reception therein of said composite beam, whereby to derive a resultant signal, means to vary the wavelength derived from said source of one of said two beams in a manner to provide a wavelength scanning action of said one of the beams, demodulation means, means to supply said resultant signal to said demodulation means, and means to gate said demodulation means synchronously with the combining of said two beams into said composite beam and to derive a time-shared output signal therefrom comprising, respectively, a spectrum representing the response to said scanning action and a baseline representing the response to the non-varied beam.

References Cited

UNITED STATES PATENTS

| | | | |
|---|---|---|---|
| 3,561,873 | 2/1971 | Hopper | 356—96 |
| 3,506,358 | 4/1970 | Baba et al. | 356—88 |

OTHER REFERENCES

Chance et al.: The Review of Scientific Instruments, vol. 41, No. 1, January 1970, pp. 111–115.

RONALD L. WIBERT, Primary Examiner

F. L. EVANS, Assistant Examiner